United States Patent [19]

Edwards

[11] 4,005,245
[45] Jan. 25, 1977

[54] TAPERED PLASTIC PREFORM FOR TELESCOPIC APPLICATION

[75] Inventor: Bryant Edwards, Clarendon Hills, Ill.

[73] Assignee: Illinois Tool Works Inc., Chicago, Ill.

[22] Filed: Apr. 15, 1975

[21] Appl. No.: 568,228

Related U.S. Application Data

[63] Continuation-in-part of Ser. No. 268,710, July 3, 1972, abandoned.

[52] U.S. Cl. .................. 428/542; 264/94; 264/97; 264/DIG. 64; 428/167; 428/179; 428/180; 428/182; 229/1.5 R; 229/4.5
[51] Int. Cl.$^2$ .................. B32B 9/04; B65D 1/00
[58] Field of Search .............. 264/DIG. 64, 94, 97; 428/187, 174, 167, 179, 180, 182, 542

[56] References Cited

UNITED STATES PATENTS

| | | | |
|---|---|---|---|
| 3,182,103 | 5/1965 | Blaylock et al. | 428/542 X |
| 3,298,893 | 1/1967 | Allen | 428/542 X |
| 3,347,966 | 10/1967 | Seefluth | 264/97 |
| 3,398,428 | 8/1968 | Fuerst et al. | 18/5 |
| 3,748,215 | 7/1973 | Lenzi | 428/167 X |

Primary Examiner—P. C. Ives
Attorney, Agent, or Firm—Edward L. Benno; Robert W. Beart

[57] ABSTRACT

The present invention relates generally to improvements in plastic preforms adapted for telescopic association with a complementary smooth surfaced mandrel such as is used in conventional plastic blow molding machines. More particularly, the present invention contemplates a novel type of plastic preform as herein, which comprises an elongate hollow plastic member, the inner surface of which in the aggregate conforms generally with the shape defined by the smooth peripheral surface of a complementary mandrel. The inner peripheral surface of the hollow plastic member or preform below the rim portion presents a plurality of circumferentially spaced surface portions adapted for initial direct impingement with restricted areas of the peripheral surface of a complementary smooth surfaced mandrel, the spacing between the said surface areas of impingement providing passageways extending generally longitudinally throughout substantially the entire longitudinal extent of the plastic member. The inner rim portion is devoid of such surface areas of impingement for air sealing the preform on the mandrel.

9 Claims, 11 Drawing Figures

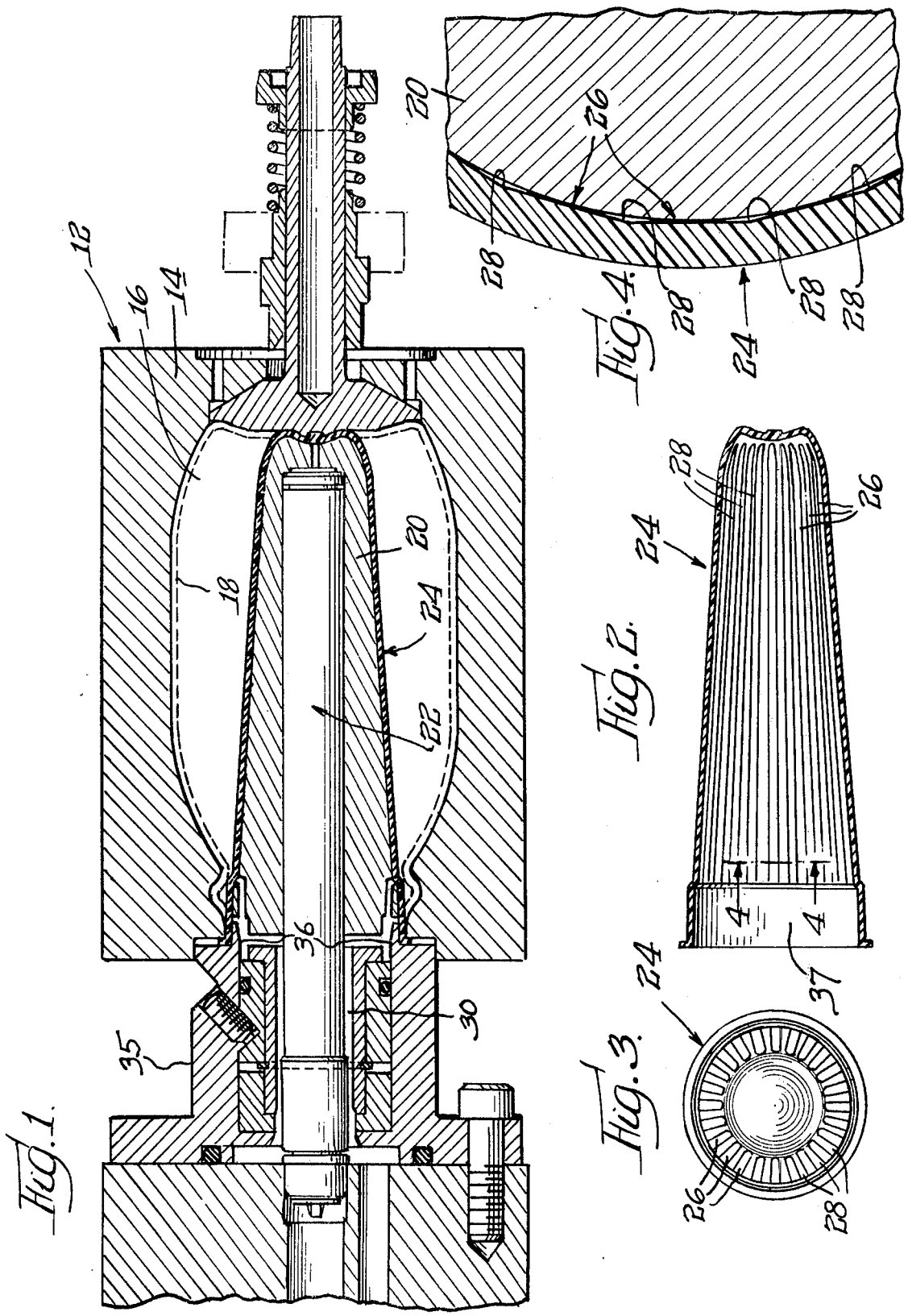

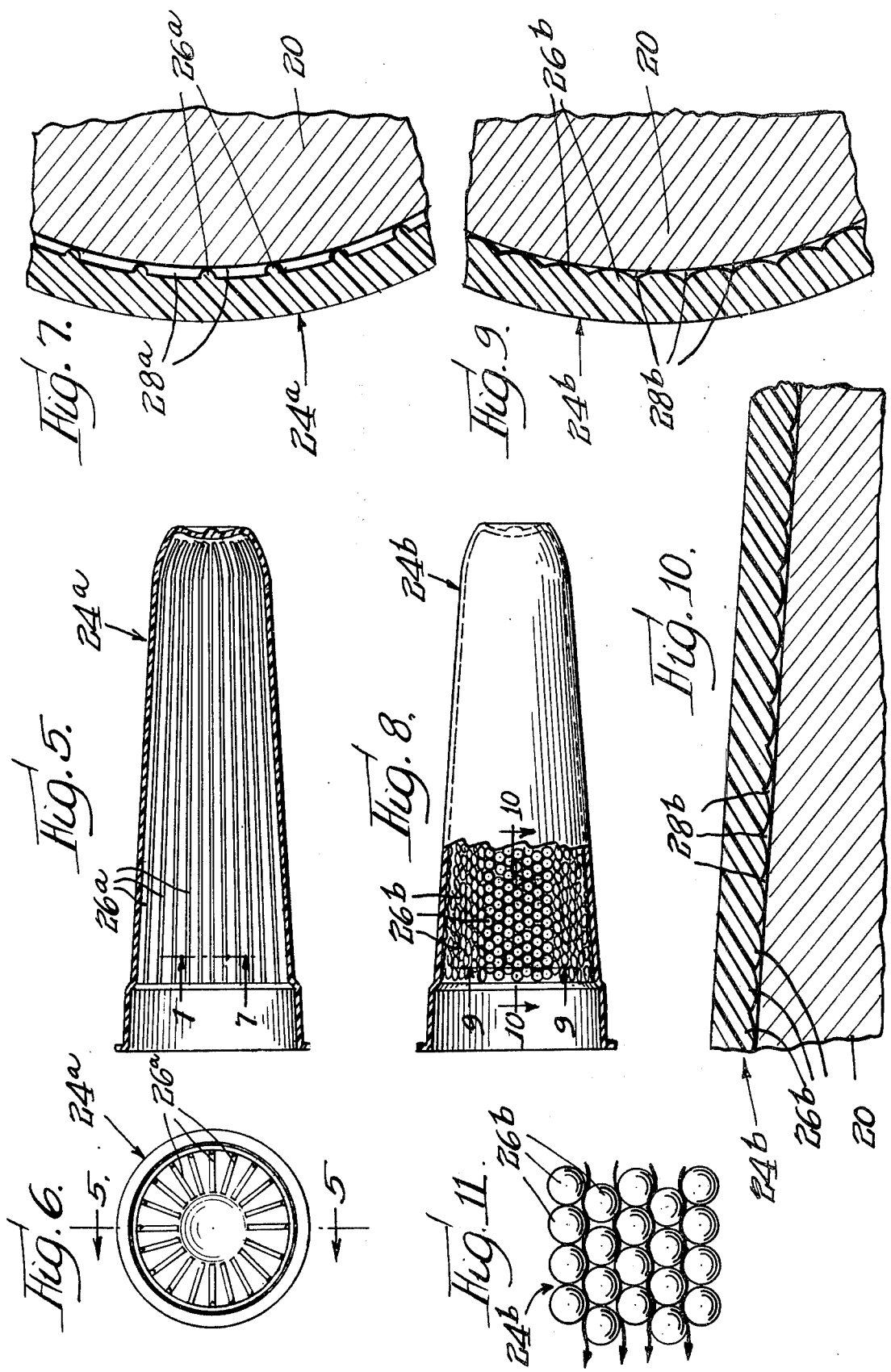

TAPERED PLASTIC PREFORM FOR TELESCOPIC APPLICATION

SUMMARY OF THE INVENTION

This application is a continuation-in-part application of my previously filed application Ser. No. 268,710 filed July 3, 1972 now abandoned.

One of the problems incident to the association of a thermoplastic pre-mold, as for example an elongate hollow, tapered plastic member, with complementary mandrel is to assure uniformity and firm impingement of the preform with the mandrel periphery. If uniform and firm impingement of the preform with the mandrel surface is not obtained, the resulting blow molded product may incorporate undesirable variations in shape and thickness. In other words, in order to produce a satisfactory blow molded plastic product, the vacuum applied to effect firm engagement of the inner periphery of the preforms with the smooth outer periphery of the mandrel and the maintained impingement while the preform is heated must be effective throughout the entire longitudinal extent of the area between the preform and the mandrel periphery. Heretofore, attempts have been made to accomplish firm engagement of a preform with a mandrel by sand blasting or otherwise roughening the periphery of the mandrel. In many instances, this has not proven satisfactory.

It is therefore one of the important objects of the present invention to provide a plastic preform which may be applied and air sealed to a mandrel having a smooth external periphery in such a manner as to assure firm impingement with the mandrel peripheral surface when vacuum is applied to the area between the mandrel surface and the inner surfaces of the preforms below their rims and the preform is softened by heat. Thus the potential hazard of experiencing non-uniformity in heating of the plastic preform stock is precluded.

More specifically, the present invention contemplates a plastic preform of the above-mentioned type having a novel interior peripheral surface arrangement which will permit vacuum conditions to be simultaneously experienced throughout the entire area adjacent the inner periphery of the preform.

The invention contemplates a new and improved preform provided with longitudinal passageways which will establish vacuum effectiveness preliminarily and during subsequent heating prior to blow molding of the preforms.

BRIEF DESCRIPTION OF THE DRAWINGS

The foregoing and other objects and advantages will be more apparent from the following detailed description when considered in connection with the accompanying drawings wherein:

FIG. 1 is a vertical central sectional view of a plastic molding machine incorporating a cavity and an elongate mandrel, a plastic preform being shown in operative, telescopic association with the mandrel in readiness to be acted upon by vacuum and heat conditions for subsequent blow molding;

FIG. 2 is a view of the preform of FIG. 1 detached from the mandrel;

FIG. 3 is an end elevation of the preform as viewed from the left of FIG. 2;

FIG. 4 is an enlarged fragmentary vertical section view taken substantially along the line 4—4 of FIG. 2 with the mandrel disclosed in association therewith;

FIG. 5 is a central sectional view similar to FIG. 2, disclosing a preform having an internal surface configuration differing from that shown in FIGS. 2, 3 and 4, said view being taken substantially along the line 5—5 of FIG. 6;

FIG. 6 is an end elevation of the preform as viewed from the left of FIG. 5;

FIG. 7 is an enlarged fragmentary sectional view, taken substantially along the line 7—7 of FIG. 5 with the mandrel disclosed in association with the preform;

FIG. 8 is a side elevational view, shown partly in section, of a plastic preform having an internal surface configuration differing from that shown in FIGS. 3 to 4, inclusive, and FIGS. 5 to 7, inclusive;

FIG. 9 is an enlarged fragmentary sectional view, taken substantially along the line 9—9 of FIG. 8 with the mandrel shown in association with the plastic preform;

FIG. 10 is an enlarged fragmentary sectional view taken substantially along the line 10—10 of FIG. 8; and FIG. 11 is an enlarged fragmentary elevational view of the internal surface of the preform illustrated in FIGS. 8 to 10, inclusive, more clearly to illustrate the manner in which the space between the mandrel impinging elements provides longitudinally extending passageways.

DESCRIPTION OF THE PREFERRED EMBODIMENT

Referring now to the drawings more in detail, wherein like numerals have been employed to designate similar parts throughout the various figures, it will be seen that FIG. 1 discloses in central cross section parts of a blow molding mechanism, designated generally by the numeral 12.

The mechanism 12 includes a conventional die block 14 having a cavity or blow mold 16 shaped to produce an article of the desired contour, as indicated by the dotted lines 18 in FIG. 1. An elongate tapered mandrel 20 is centrally positioned within the mold cavity 16 and a conventional electrical heating unit 22 extends within the mandrel. Attention is also directed to the fact that the mandrel 20 has a smooth peripheral surface. The mandrel 20 further includes a holder 35 having an annular shoulder 36 for engagement with the interior rim portion of a preform to effect an air seal of the preform on the mandrel. Specific reference to the structural details of the conventional molding mechanism 12 has been omitted, in view of the fact that the present invention is directed primarily to a plastic preform designated generally by the numeral 24. The plastic preform 24 is shaped to be telescopically accommodated by the mandrel 20. The elongate hollow plastic member or preform 24, formed of a thermoplastic material, has an inner surface which in the aggregate conforms generally with the tapered shape of the smooth peripheral surface of the mandrel 20. It will be noted, however, that the inner peripheral surface of the preform 24 below the inner rim portion presents a plurality of circumferentially spaced relatively narrow surfaces 26 extending longitudinally over substantially the entire length of the portion of the preform which engages the periphery of the mandrel. Between these restricted areas 26 are longitudinally extending spaces 28. After the preform 24 has been initially associated with the mandrel 20, the surfaces 26 impinge the smooth peripheral surface while the inner rim portion 37 which is circumferentially smooth frictionally engages the annular shoulder 36 in an air sealing relationship.

With the preform 24 applied over the mandrel 20, as shown in FIG. 1, air from between the inner surface of the preform 24 below the air sealed inner rim portion 37 and the outer smooth peripheral surface of the mandrel 20 is evacuated through a channel or passageway 30, FIG. 1, in the mandrel assembly. The passageway 30, circumferentially of the mandrel 20, is in air communication with the outer end of all of the passageways 28. As the mandrel 20 below the holder 35 is subjected to heat from the heating element 22, the preform 24 below the inner rim portion softens. Although the mandrel assembly is shown in the die block 14, heating of the preform 24 on the mandrel 20 generally occurs before the mandrel assembly is inserted into the die block 14 for blowing of the preform. The presence of the longitudinal passageways or spaces 28 assures firm uniform impingement of the inner periphery of the preform with the periphery of the mandrel 20. In this manner, uniformity of contact of the preform is maintained throughout its entire longitudinal extent because uniform vacuum conditions exist throughout the entire longitudinal extent of the preform below the inner rim portion. Uniformity of contact of the interior surface of the preform insures uniform heating of the preform. As the preform softens, the entire inner surface of the preform will contact the surface of the mandrel 20 and the passageways 28 will effectively disappear. When the preform has been sufficiently softened, and with the mandrel assembly in the die block 14 as shown, air under pressure is introduced through the passageway 30 and causes the preform below the inner rim portion to be blown into a shape determined by the shape of the mold cavity 16. This procedure is commonly referred to as "blow molding".

In FIGS. 5 to 7, inclusive, a modified preform is designated generally by the numeral 24a. The preform 24a differs only from the previously described preform 24 in the provision of a plurality of longitudinally extending ribs 26a below the inner rim portion. These ribs 26a, like the previously described longitudinal surfaces 26, make an initial restricted area contact with the smooth periphery of the aforementioned mandrel 20. Spaces 28a presented between the ribs 26a cooperate to establish uniform vacuum conditions throughout the entire space between the outer periphery of the mandrel and the inner peripheries of the preform 24a below the inner rim portion. By having the internal surface of the preform arranged as shown in FIGS. 5 through 7, inclusive, uniformity in heating the form is maintained.

In FIGS. 8 to 11, inclusive, a preform 24b of further modified form is illustrated. It will be seen that the internal surface of the plastic preform below the inner rim portion 24b comprises a plurality of knobs or protuberances 26b, adapted to make initial restricted area contact with the smooth peripheral surface of the mandrel 20. Spaces 28b presented between the adjacent protuberances or knobs 26b provide passageways, indicated by the wavy lines in FIG. 11, extending longitudinally over substantially the entire extent of the preform. With a preform such as preform 24b, vacuum passageways other than at the outer end of the preform may be conveniently provided in the mandrel because the passageways 28b are in circumferential air communication in addition to the longitudinal communication shown in FIG. 11.

In all of the preform structures illustrated herein, the inner surface below the inner rim portion thereof is provided with areas adapted to make initial restricted contact with the smooth periphery of the mandrel, and the initial space between said mandrel contacting surfaces assure required uniform vacuum conditions between the inner surface of the preform and the outer surface of the mandrel. All of the preforms herein disclosed and described function to assure firm uniform impingement of the preform with the periphery of the mandrel when in telescopic association therewith, and as the result the preform is uniformly heated. Hence, when the heated preform is subject to blow molding, a product of uniform thickness and freedom from peripheral imperfections is produced. Also, the present invention precludes the necessity of employing mandrels with specially formed peripheral surface contours, such as may result from sand blasting, and the like. By employing applicant's novel plastic preform conventional smooth surfaced mandrels may be used.

The preforms of the subject invention may be made by any known suitable process such as injection molding wherein a molten thermoplastic material is injected into a mold the inner walls of which define the shape of the preform, and after which the molded preform is cooled and removed from the mold.

I claim:

1. A plastic preform for telescopic application onto a complementary smooth surfaced heated mandrel in a plastic molding machine for re-shaping the preform under heat and applied differential air pressure, said preform comprising an elongate hollow thermoplastic member the inner surface of which in the aggregate conforms generally with the shape defined by the peripheral surface of said smooth surfaced mandrel, said elongate hollow thermoplastic member being longitudinally tapered from an open end to a closed opposite end, said inner surface of said hollow thermoplastic member being formed between an axially extending rim portion and said closed opposite end as a plurality of uniformly spaced-apart surface portions engageable in a heat conducting relationship with said peripheral surface of said mandrel upon close telescopic application thereto, the inner surface of said axially extending rim portion of said hollow thermoplastic member being substantially circumferentially smooth to cooperate in an air sealing relationship with the surface of said mandrel upon close telescopic application thereto, the spaces between said spaced-apart surface portions forming substantially uniformly distributed and interconnected air passageways over substantially the entire inner surface of said hollow thermoplastic member between said axially extending rim portion and said closed opposite end for uniform air evacuation from between the inner peripheral surface of said hollow thermoplastic member below said axially extending rim portion and the smooth peripheral surface of said mandrel upon close telescopic application thereto and with uniform heat conducting engagement of said spaced-apart surface portions with said peripheral surface of said mandrel.

2. A plastic preform for telescopic application onto a complementary surfaced heated mandrel, as set forth in claim 1, wherein said spaced-apart surface portions extend in rows substantially longitudinally of said inner surface of said hollow thermoplastic member below said axially extending rim portion.

3. A plastic preform for telescopic application onto a complementary surfaced mandrel, as set forth in claim 1, wherein said spaced-apart surface portions are shaped as circumferentially spaced-apart and longitudinally extending ribs below said axially extending rim portion.

4. A plastic preform for telescopic application onto a complementary smooth surfaced mandrel, as set forth in claim 3, wherein said ribs are substantially wider than the spaces therebetween.

5. A plastic preform for telescopic application onto a complementary smooth surfaced mandrel, as set forth in claim 3, wherein said ribs are substantially narrower in width than the spaces therebetween.

6. A plastic preform for telescopic application onto a complementary smooth surfaced mandrel, as set forth in claim 1, wherein said spaced-apart surface portions are shaped as protuberances spaced-apart from each other circumferentially and longitudinally of said hollow thermoplastic member below said axially extending rim portion.

7. A plastic preform for telescopic application onto a complementary smooth surfaced mandrel, as set forth in claim 1, wherein said spaced-apart surface portions are shaped as a plurality of knobs projecting radially inwardly of said inner surface of said hollow thermoplastic member below said axially extending rim portion.

8. A plastic preform for telescopic application onto a complementary smooth surfaced mandrel, as set forth in claim 1, wherein said closed opposite end is substantially semispherical in shape.

9. A plastic preform for telescopic application onto a complementary smooth surfaced mandrel, as set forth in claim 1, wherein said spaced-apart surface portions and the spaces between said spaced-apart surface portions are shaped as a series of circumferentially disposed and longitudinally extending flat planar surfaces below said axially extending rim portion.

* * * * *